(12) United States Patent
Solomon

(10) Patent No.: US 6,339,894 B1
(45) Date of Patent: Jan. 22, 2002

(54) WATERFOWL DECOY WITH INTERCHANGEABLE MOVABLE APPENDAGES

(76) Inventor: Walter Solomon, 505 N. Price, Marshall, TX (US) 75670

( * ) Notice: Subject to any disclaimer, the term of this patent is extended or adjusted under 35 U.S.C. 154(b) by 0 days.

(21) Appl. No.: 09/354,025

(22) Filed: Jul. 15, 1999

Related U.S. Application Data

(63) Continuation-in-part of application No. 09/247,842, filed on Feb. 10, 1999.

(51) Int. Cl.[7] .............................................. A01M 31/06
(52) U.S. Cl. ............................................................ 43/3
(58) Field of Search ................................ 43/3; 406/158, 406/157, 156, 164

(56) References Cited

U.S. PATENT DOCUMENTS

| | | | | |
|---|---|---|---|---|
| 3,628,286 A | * | 12/1971 | Mashabiro | 46/247 |
| 4,620,385 A | * | 11/1986 | Carranza et al. | 43/3 |
| 5,791,081 A | * | 8/1998 | Turner et al. | 43/2 |
| 5,809,683 A | * | 9/1998 | Solomon | 43/3 |
| 5,930,936 A | * | 8/1999 | Parr | 43/3 |

* cited by examiner

*Primary Examiner*—Peter M. Poon
*Assistant Examiner*—Kevin Jakel
(74) *Attorney, Agent, or Firm*—The Law Offices of D. Scott Hemingway

(57) ABSTRACT

A waterfowl decoy with interchangeable moveable appendages includes a body with a hollow interior and two opposed sides with shaft apertures extending through the two sides in opposed relation to each other, a drive assembly with two battery powered electric motors, each having a rotatable output shaft, disposed in the hollow interior of the body with the output shafts extending through the shaft apertures on each side of the body of the decoy, and a variety of appendage assemblies each removeably connectable to an output shaft of one of the motors. Each appendage assembly has a hub and at least one appendage such as a wing and/or a paddle connected to the hub, so that upon activation of the motors the hubs rotate and the appendages move to simulate movements of live waterfowl.

19 Claims, 19 Drawing Sheets

WATERFOWL DECOY WITH INTERCHANGEABLE MOVABLE APPENDAGES

RELATED APPLICATION DATA

This application is a continuation in part of U.S. Utility patent application Ser. No. 09/247,842, filed Feb. 10, 1999, and titled "Self-Propelled Waterfowl Decoy".

FIELD OF THE INVENTION

The present invention generally relates to waterfowl decoy devices, and in its preferred embodiments more specifically relates to waterfowl decoy devices that provide wing movement and that provide wing movement, propulsion, and splashing action to simulate the appearance of live waterfowl.

BACKGROUND OF THE INVENTION

Waterfowl decoys have long been used by hunters in an effort to attract ducks and other waterfowl to a particular body of water or to a particular location in a body of water. Traditionally, such decoys have been made as inanimate structures that are placed on a body of water and allowed to float passively thereon, without movement of any kind. In the past, passive stationary decoys have been reasonably effective in attracting waterfowl to land in proximity to the decoy or decoys. However, waterfowl adapt to changes in their environment, and in response to increased hunting pressure many waterfowl have become more cautious in their behavior and are less likely to be attracted by stationary decoys. It appears that many waterfowl have learned to distinguish the difference between live birds and stationary decoys. Among the primary difference between live birds and traditional decoys are movement, and splashing of the water. Live waterfowl are constantly moving their bodies and splashing water as they move and feed.

Attempts have been made in the past to overcome the problems associated with stationary decoys, and decoys that exhibit various forms of motion are known in the prior art. For example, U.S. Pat. No. 2,799,960 to Riley discloses a decoy with a motor driven propeller and movable head. Other examples of propeller driven decoys include U.S. Pat. No. 2,814,146 to Propp; U.S. Pat. No. 2,835,064 to Webb; U.S. Pat. No. 3,074,195 to Vanderpool; and U.S. Pat. No. 3,000,128 to McAda. U.S. Pat. No. 2,443,040 to Jones and U.S. Pat. No. 2,704,416 to Laird disclose decoys with fully submerged paddle mechanisms to impart movement to a decoy. Other examples include U.S. Pat. No. 2,747,314 to McGregor, which discloses a decoy apparatus with movable wings and head; U.S. Pat. No. 2,480,390, which discloses a decoy with movable wings; U.S. Pat. No. 4,896,448, which discloses a decoy with movable wings; and British Patent No. 383,031, which discloses a bird decoy with movable wings.

The efforts known in the prior art have been effective in producing one or more forms of motion, but have been much less effective in producing lifelike motion and imparting a realistic appearance to decoys, and in producing water movement around the decoys. Accordingly, they have been only marginally successful in providing the desired effect of attracting waterfowl. Many of the apparatus designs known in the prior art are complex in structure, adding to the cost of production and to the difficulty of use. There remains a need for decoy apparatus that produce movement to realistically simulate the appearance of live waterfowl. There also remains a need for decoy apparatus that produce movement of the water surrounding the decoy so as to realistically simulate the movement of the water created by live waterfowl.

SUMMARY OF THE INVENTION

The present invention provides a waterfowl decoy that addresses and overcomes the deficiencies and problems of the prior art by producing movement of appendages associated with the decoy, and that will also simultaneously produce splashing of the water around the decoy. The movement exhibited by the decoy of the present invention is produced by a drive apparatus that is simple in structure and operation, inexpensive to produce, and easy to install in a hollow decoy body of conventional design. The optional simultaneous movement and splashing actions of the decoy are simultaneously produced by the same drive apparatus.

The present invention utilizes a conventional floating decoy body, generally comprising a body with a hollow interior, a top, two opposing sides, a head end, and a tail end. An opening is formed in the top of the decoy body to provide access to the hollow interior for installation of the drive assembly, for installation and adjustment of appendage assemblies, and for operation of the drive assembly. The decoy body is also provided with a pair of shaft apertures formed in the opposing sides of the body through which drive shafts extend.

The drive assembly of the preferred embodiment of the present invention includes a pair of drive means, preferably battery powered electric motors, each of which drives a rotary shaft that extends through one of the shaft apertures in the sides of the body of the decoy and to which an appendage assembly is attached. In the preferred embodiment the output shaft of each motor comprises the drive shaft, and each motor is oriented in the hollow interior of the body with the drive shaft extending toward the adjacent side of the body and through the shaft aperture therein, so that the drive shafts are generally parallel to the surface of the water in which the decoy will float. The shaft apertures are positioned in the sides of the body, and the drive means are positioned in the hollow interior of the body, so that the drive shafts are disposed a distance above the surface of the water when the decoy is floating thereon. An appendage assembly is connected to each drive shaft so that rotation of the drive shaft will cause rotation of the appendage. The decoy of the invention may also be constructed with alternative embodiments of the drive assembly, if desired. A single motor, with a single output shaft, may be utilized to rotate the drive shafts through a gear box or other transmission assembly, or a single motor with dual opposed output shafts may be used, for example.

A variety of appendage assemblies may be interchangeably used within the scope of the present invention, and in the preferred embodiment at least the following appendage assemblies are provided: a paddle wheel assembly, a rotating wing assembly, a combined paddle wheel and rotating wing assembly, and a windmill wing assembly. Each of these appendage assemblies includes a hub component adapted to be connected to a drive shaft of the drive assembly of the decoy, with wing structures and/or paddle structures connected to the hub. With all but the windmill wing assembly, the decoy may be operated while floating on a body of water or may be placed on a stand on land or above the surface of the water. Because of the range of movement of the wings of the windmill wing assembly and the need for clearance below the decoy, windmill wing embodiment is operated with the decoy on a stand.

The structure and features of the preferred and various alternative embodiments of the invention are disclosed in detail with reference to the accompanying drawing figures.

DETAILED DESCRIPTION OF THE PREFERRED AND CERTAIN ALTERNATIVE EMBODIMENTS

Figure 1:
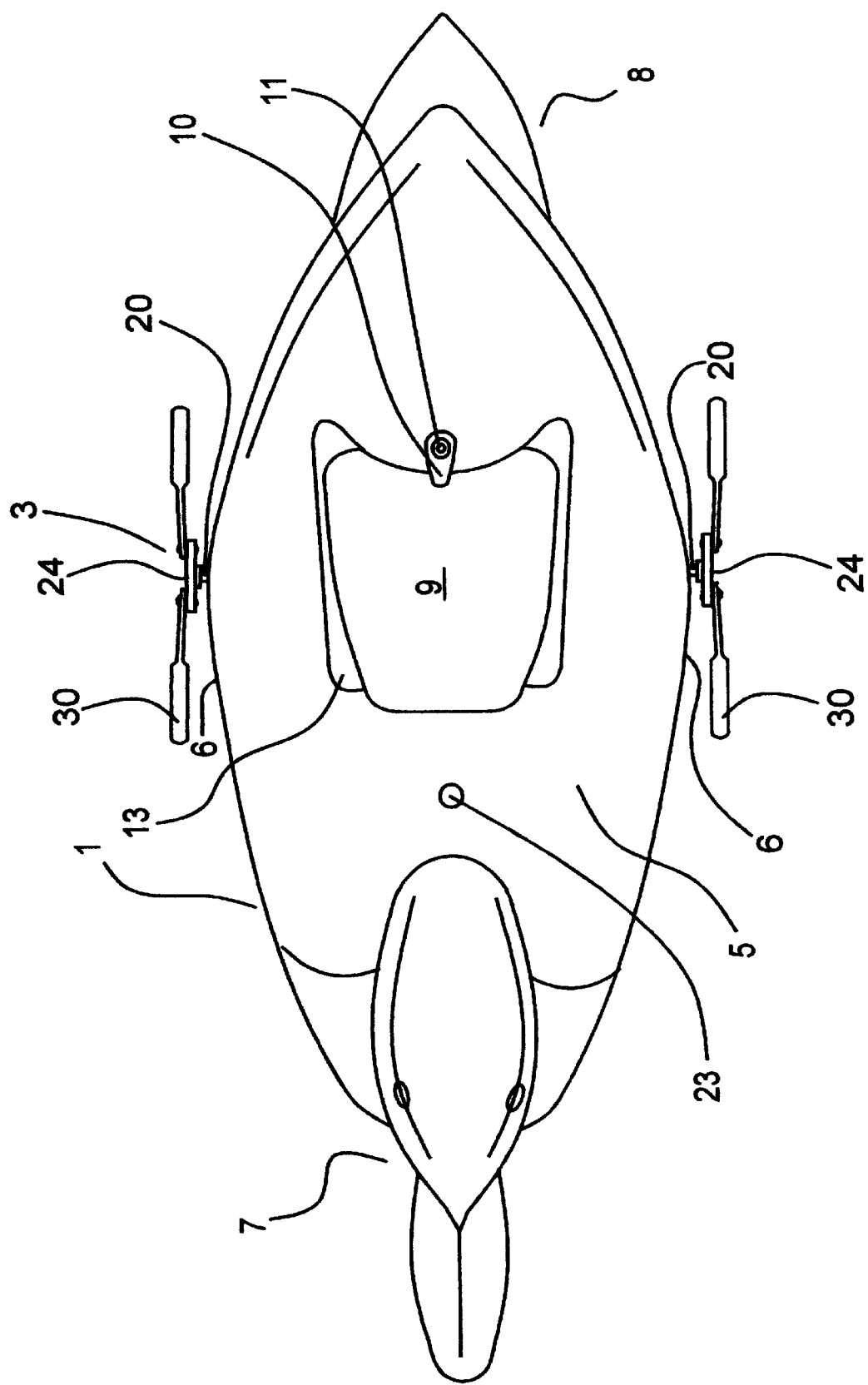
FIG. 1 is a top view of a decoy of the preferred embodiment of the invention, with paddle wheel appendage assemblies.
Figure 2:
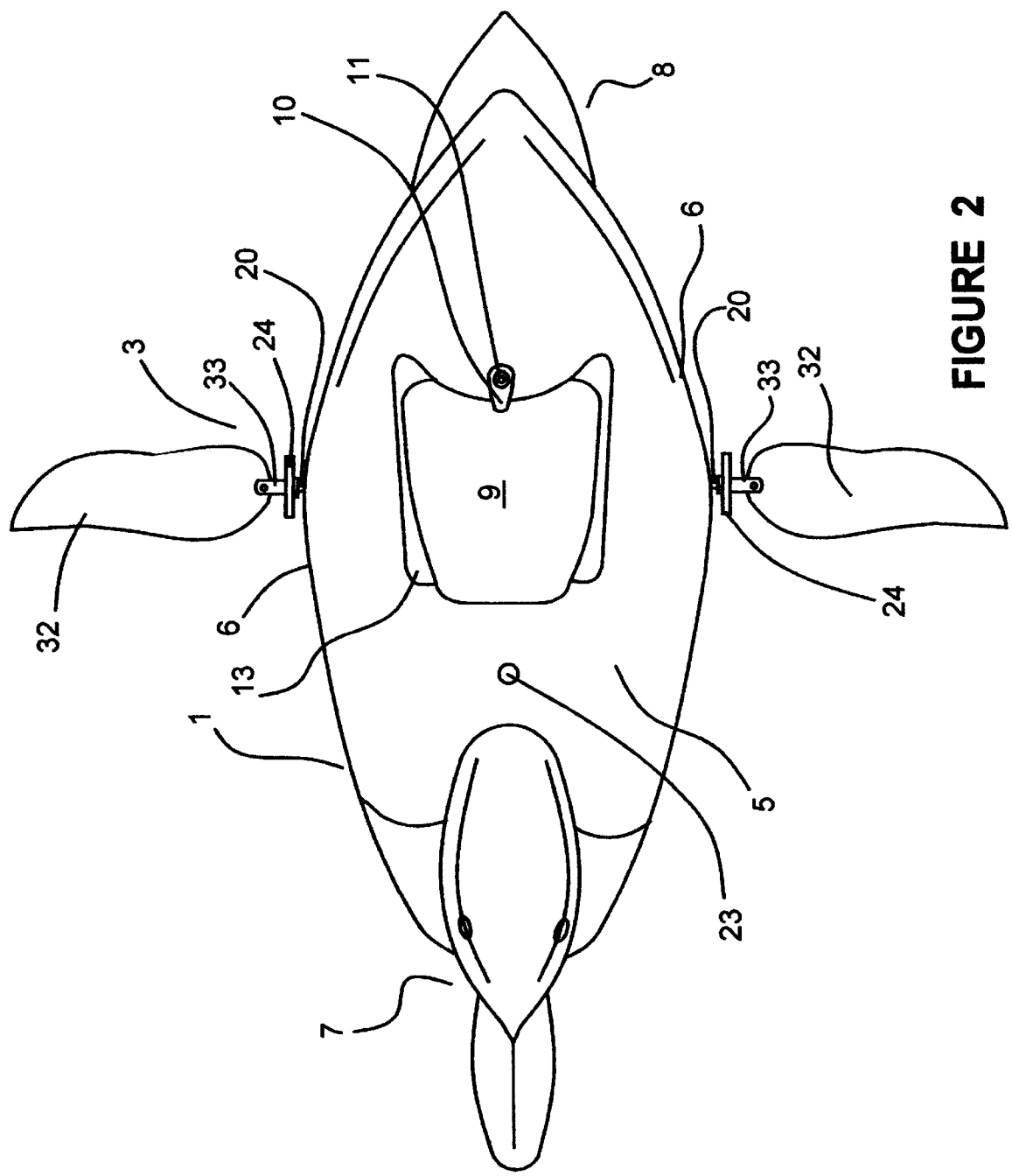
FIG. 2 is a top view of the decoy of the preferred embodiment of the invention, with rotating wing appendage assemblies.
Figure 3:
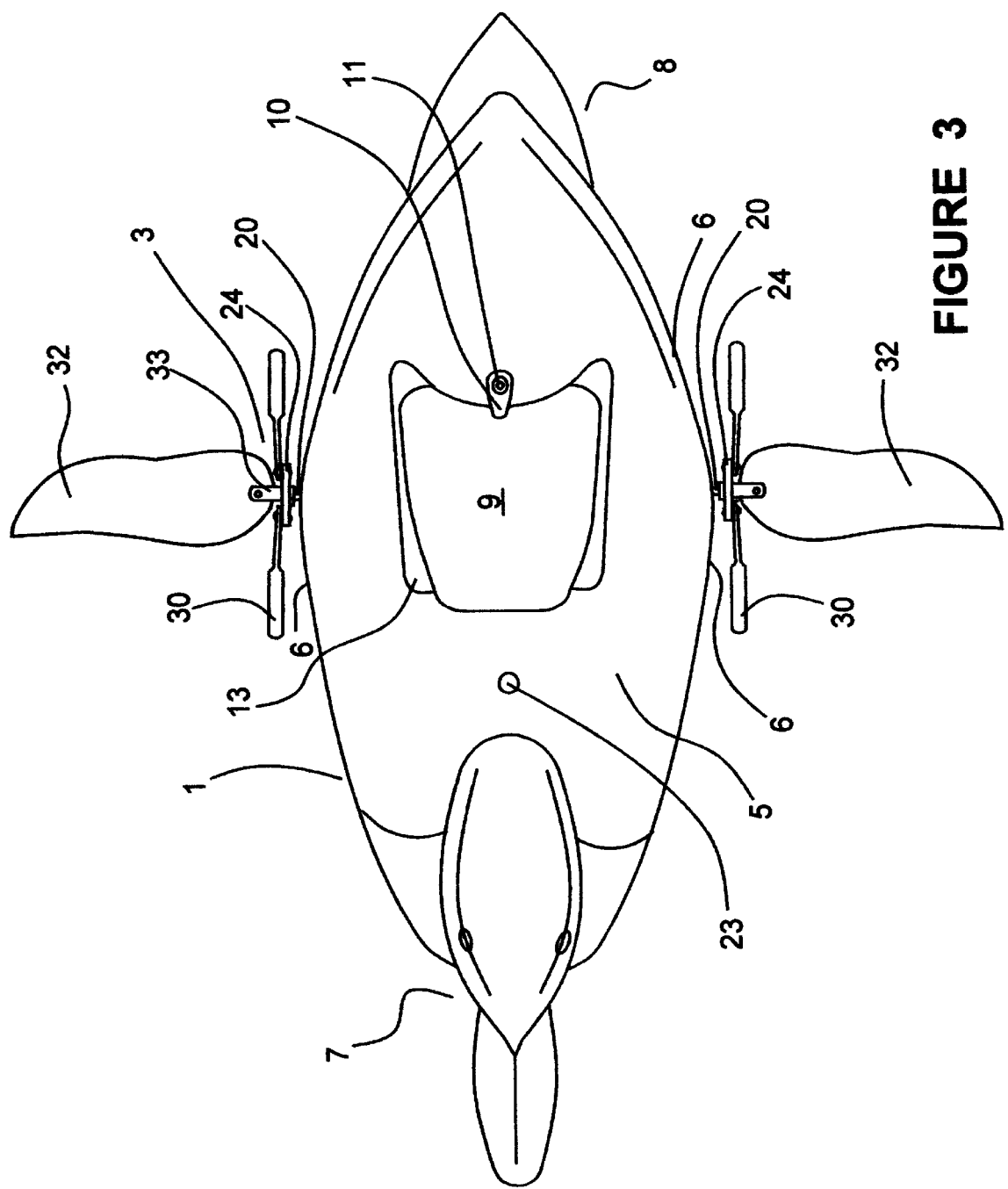
FIG. 3 is a top view of the decoy of the preferred embodiment of the invention, with combined paddle wheel and rotating wing appendage assemblies.

Referring to the drawing figures, the preferred embodiment of the decoy of the invention will be seen to generally include a hollow decoy body 1, a drive assembly 2, and a pair of appendage assemblies 3.

The apparatus of the invention is designed for use with a conventional commercial waterfowl decoy constructed with body 1 surrounding a hollow interior 4. Body 1 includes a top 5, opposing sides 6, a head end 7, and a tail end 8. The body of the decoy is formed with, or a commercially obtained decoy is prepared by forming, a flap 9 in the top 5 to provide an opening for insertion of the drive assembly. Flap 9 may be lifted to expose an opening into the interior 4 of body 1, and then pushed back into place to close the opening. Flap 9 is secured in place in a closed position by latch 10, preferably a semi-rigid plastic strip secured to the top of the body with fastener 11. Fasteners used in the construction of the apparatus of the invention may be rivets, eyelets, brads, or other convenient fastening devices. Fastener 11 allows latch 10 to rotate around the fastener so that the latch can be moved to selectively release or secure flap 9. A shaft aperture 12 is provided in each side 6 of the body 1, near the midpoint thereof, to receive a drive shaft. A sealing gasket 13 is preferably connected to top 5 of body 1 around the edges of the opening into the interior of the body to seal against the edges of flap 9 and prevent water from splashing into the interior of body 1 when flap 9 is closed and the decoy is in use.

Figure 4:
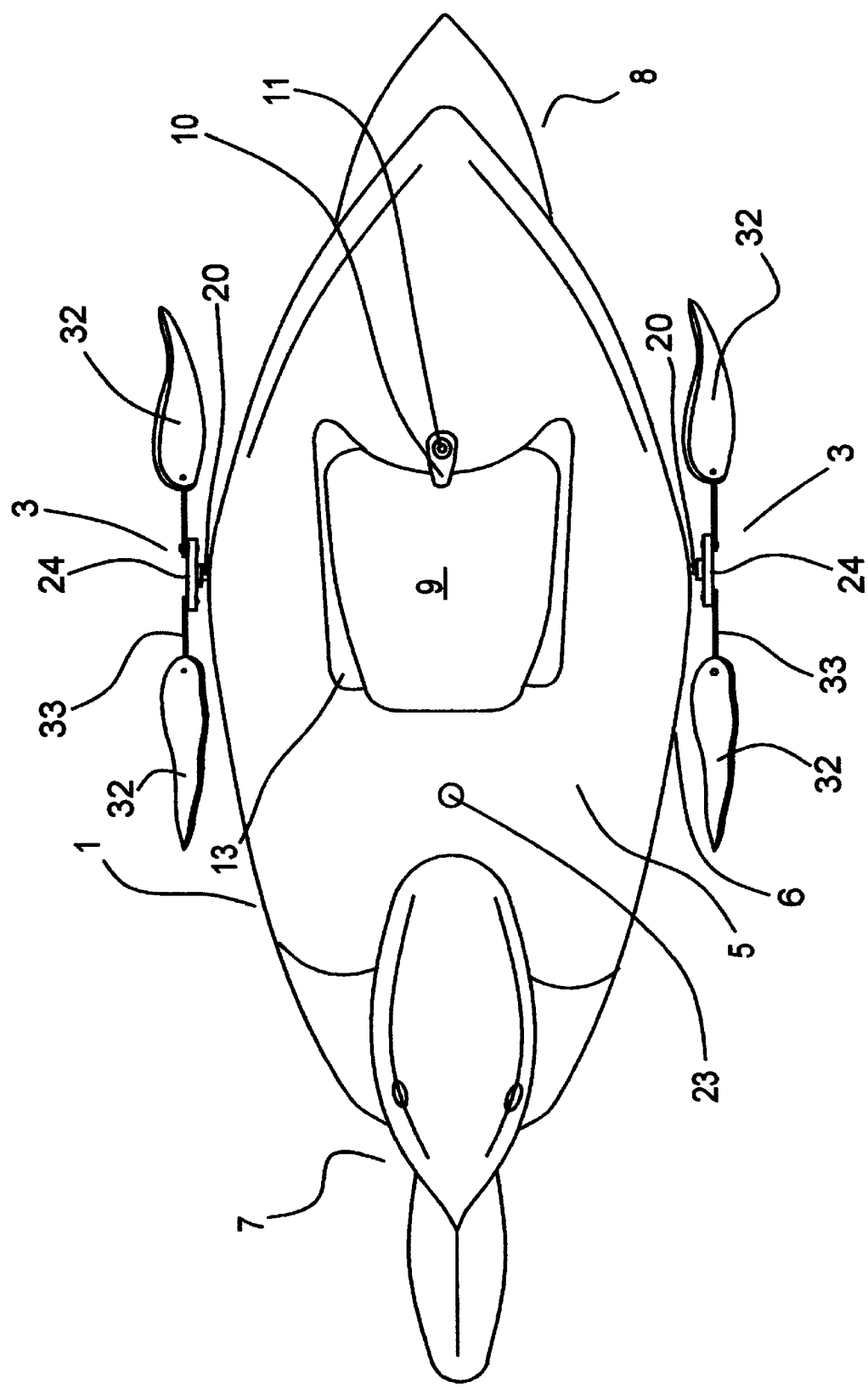
FIG. 4 is a top view of the decoy of the preferred embodiment of the invention, with windmill wing appendage assemblies.
Figure 5:
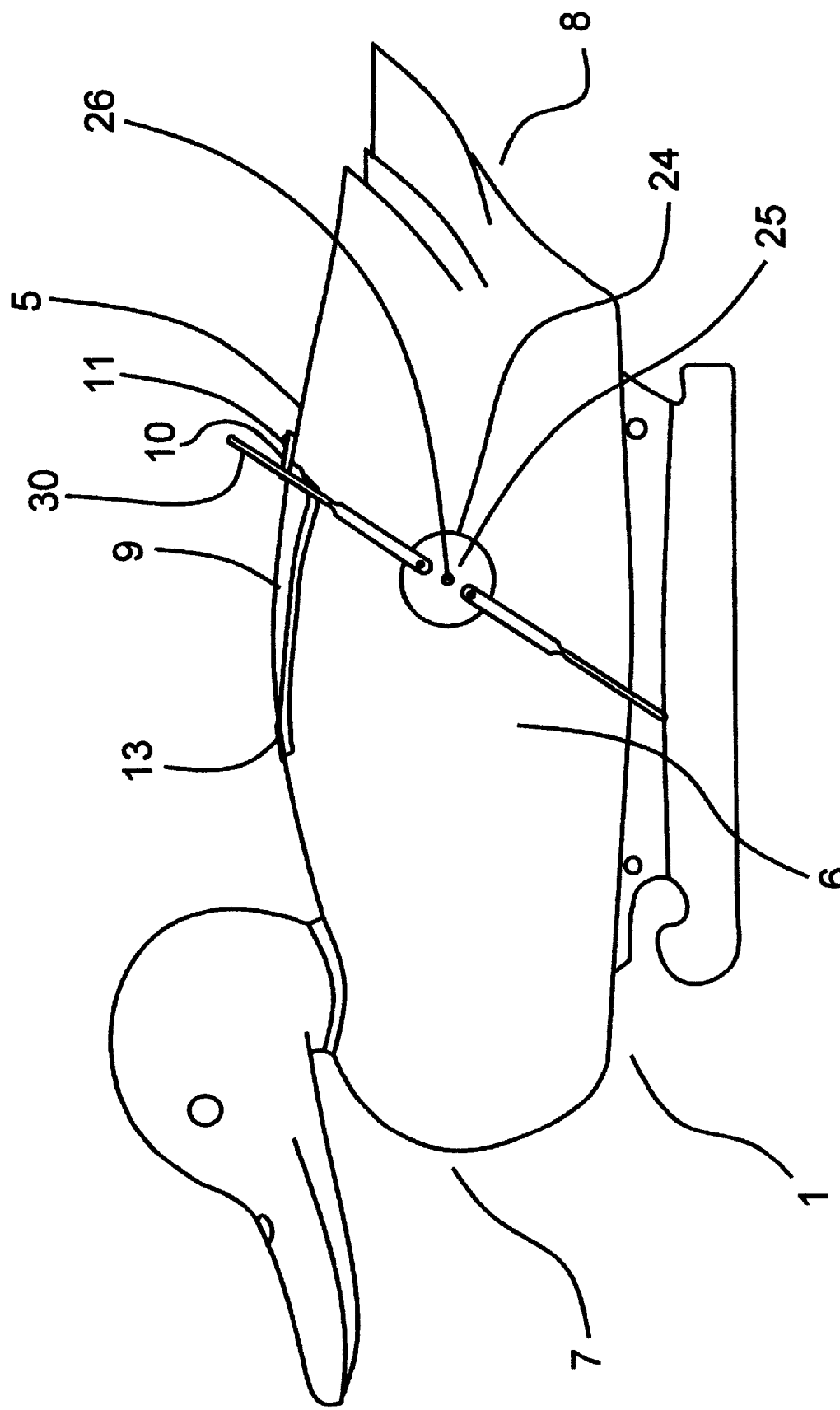
FIG. 5 is a side view of a decoy of the preferred embodiment of the invention as shown in FIG. 1.
Figure 6:
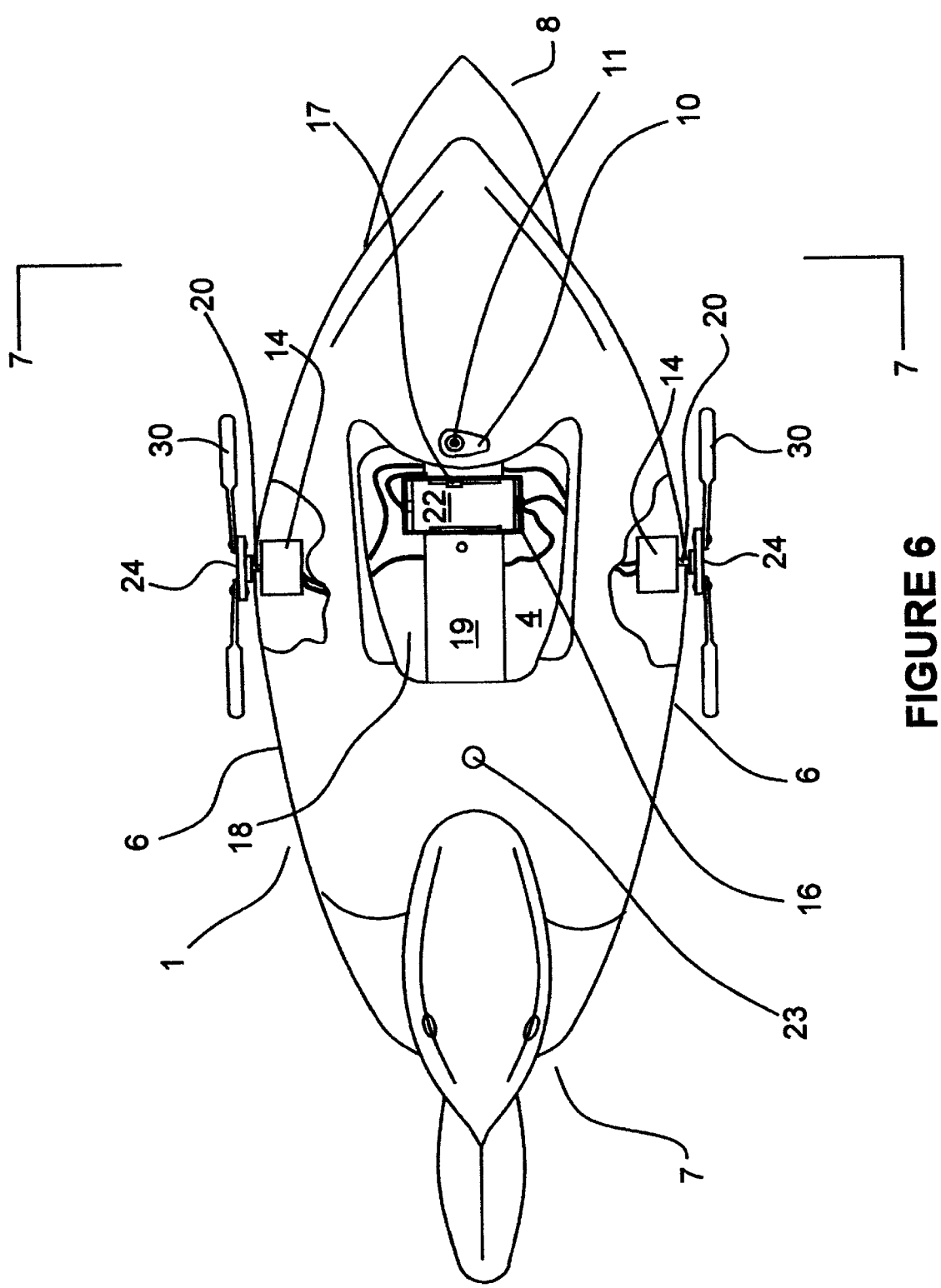
FIG. 6 is a top view of the drive assembly of the preferred embodiment of the invention, with paddle wheel appendage assemblies, installed in a decoy body, with the lid flap removed to show the installation.
Figure 7:
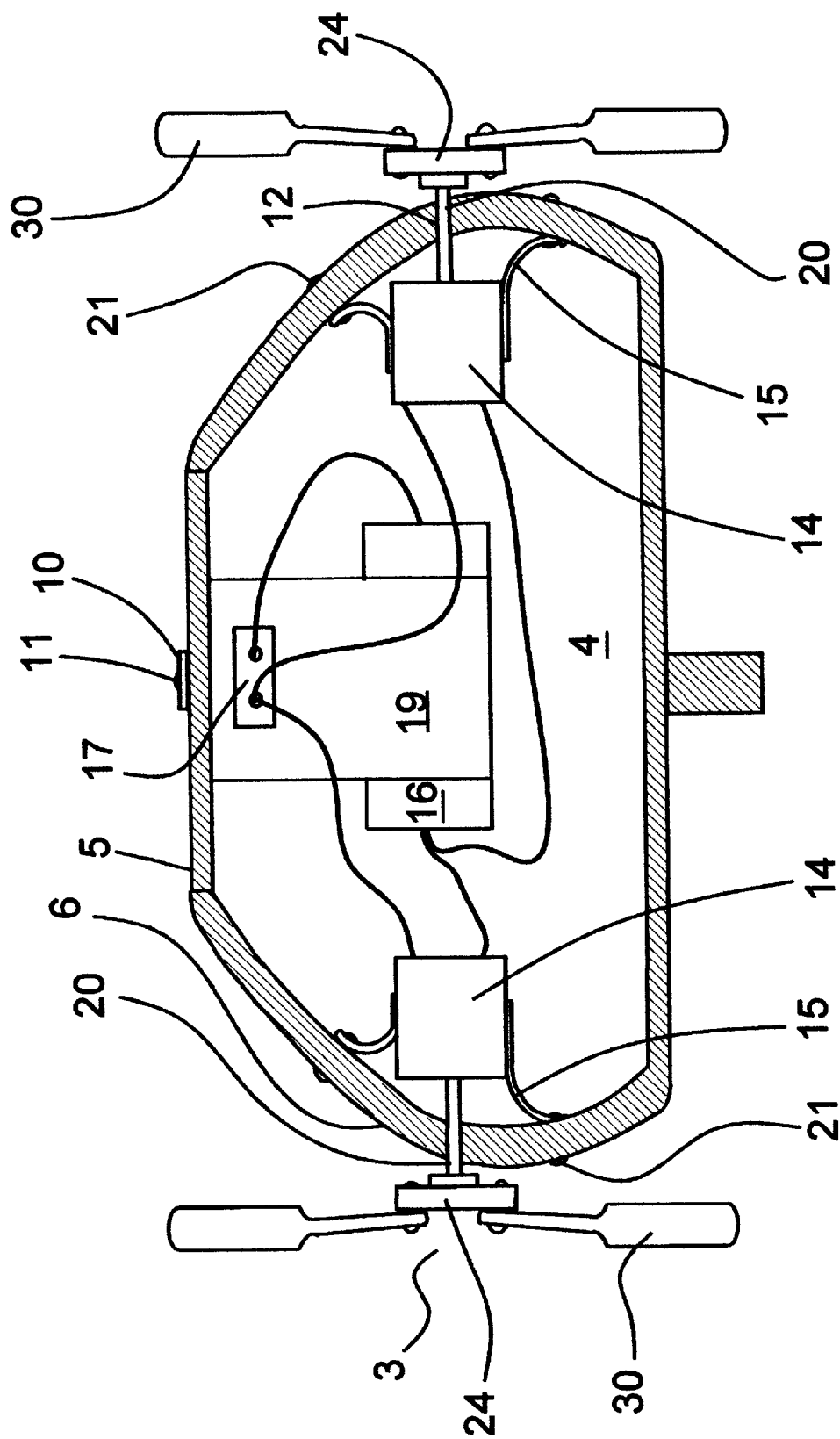
FIG. 7 is a cross-sectional view of the preferred embodiment of the decoy of the invention with paddle wheel appendage assemblies, along line 7—7 of FIG. 6.
Figure 8:
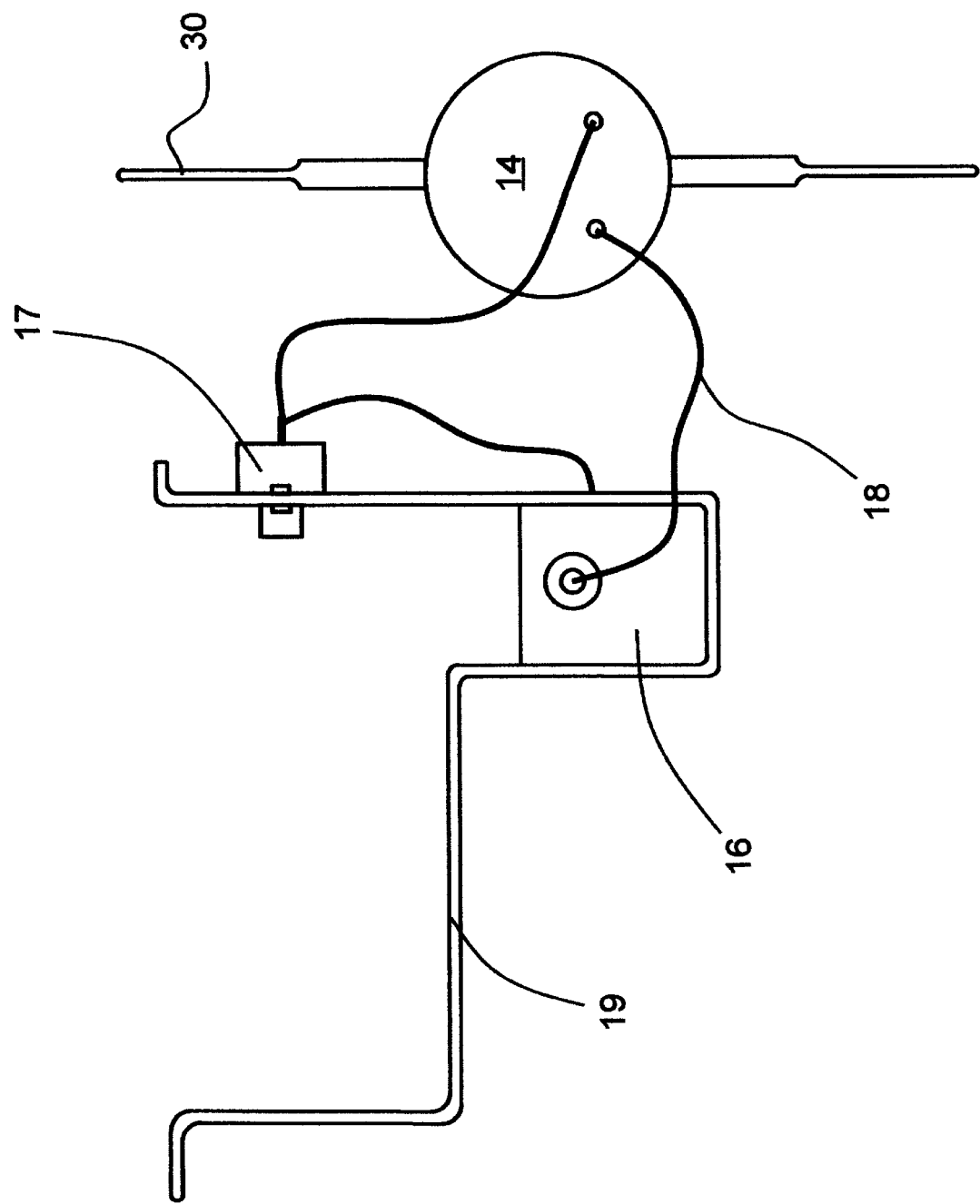
FIG. 8 is a side view of the preferred embodiment of the drive assembly of the invention, prior to installation into the body of a decoy, with one motor omitted for clarity.

In the preferred embodiment of the invention, drive assembly 2 generally includes a pair of battery powered electric motors 14, motor mounts 15, a battery holder 16 with on-off switch 17, associated wiring 18, and a mounting bracket 19 for the battery holder and switch. Each motor 14 includes an output shaft 20, which is caused to rotate when electrical power is applied to the motor. Each motor 14 preferably comprises a commercial 1.5 volt low speed electric motor with a no-load speed of approximately 115 rpm, which results in an operating speed under load of up to about 80 rpm. However, it should be understood that alternative drive means may be utilized instead of electric motors 14, such as other types of electric motors or even mechanically driven motors, within the scope of the invention. Each motor 14 is provided with a motor mount 15 which is secured to a respective side 6 of body 1 by fasteners 21, with output shaft 20 extending through a shaft aperture 12 to the exterior of body 1, as illustrated in FIG. 4.

A conventional commercially available battery holder 16 and conventional on-off slide switch 17 are secured to mounting bracket 19. Battery holder 16 includes positive and negative contacts connected to switch 17 and motors 14 by wiring 18. Battery holder 16 is preferably sized for one 1.5 volt D-cell battery 22. Again, it should be understood that other types of battery holders, switches, and configurations may be utilized, if desired, within the scope of the invention. Mounting bracket 19 is preferably made from corrosion-resistant aluminum and is shaped to accommodate the components of the drive assembly attached to it and to position the battery holder and switch to facilitate access to them with the drive assembly installed in the body of the decoy. Mounting bracket 19 is secured in the interior of body 1 by fasteners 23 and 11.

The drive assembly of the invention is inserted into the hollow interior of the body through the opening in the top of the body with flap 9 lifted to provide access. Each motor 14 is positioned on a respective side of the body with its output shaft 20 extending through a shaft aperture 12, and secured in place with fasteners 21. In the preferred embodiment output shafts 20 function directly as drive shafts for the appendage assemblies 3. Mounting bracket 19, with battery holder 16 and switch 17 connected thereto, is secured in position in the hollow interior of the body with fasteners 23 and 11. Fastener 11 is used as a common fastener for both latch 10 and the tail end of mounting bracket 19. Wiring 18 may be connected between battery holder 16, 20 switch 17, and motors 14 before or after attachment of those components to the body of the decoy. It should be noted that while switch 17 is included in the preferred embodiment of the drive assembly, the switch could be omitted so that motors 14 are activated by insertion of a battery into the battery holder and deactivated by removal of the battery.

The drive assembly of the decoy operates the appendage assemblies 3 to impart motion to the decoy. Each appendage assembly 3 includes a hub 24 for connection to a drive shaft associated with a motor 14. Each hub 24 comprises an appendage attachment member, preferably a disk 25, which is penetrated by a central disk aperture 26 to receive a drive shaft therethrough. A collar 27, preferably formed as a cylindrical body with a central collar aperture 28, is interconnected to one face of disk 25 with collar aperture 28 coaxially aligned with hub aperture 26 so that a drive shaft may be extended through the aligned apertures. Connection means, preferably an adjustable set screw 29 is provided in collar 27 to selectively grip a drive shaft and removably connect hub 24 to the drive shaft. It is preferred that hubs 24 used for all appendage assemblies available for use in the decoy of the invention be of the same configuration, but it should be understood that alternative hub configurations could be employed, and that differing hub configurations could be used for different appendage assemblies.

Figure 15:
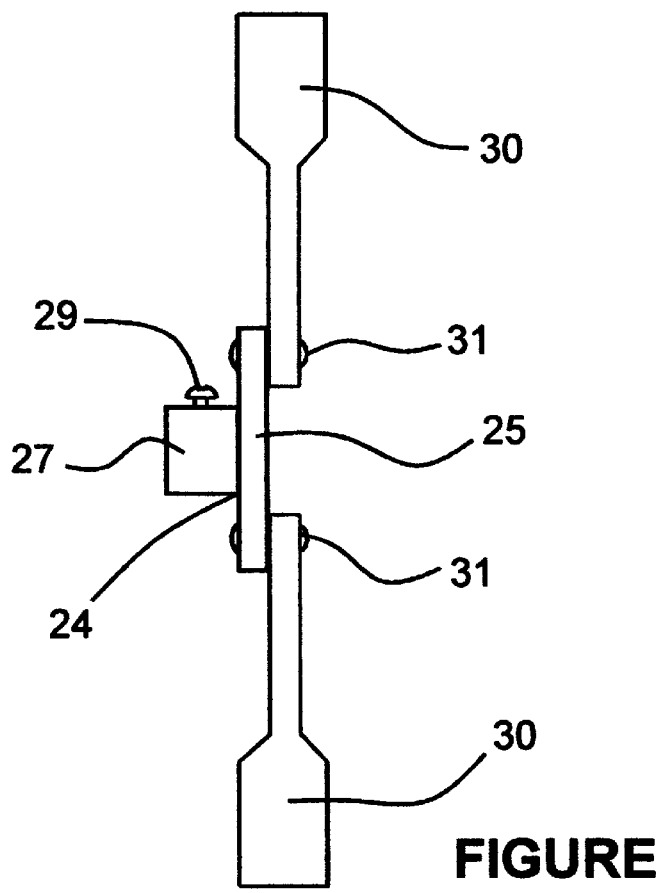
FIG. 15 is a side view of the paddle wheel appendage assembly of the invention, viewed parallel to the plane of the hub.
Figure 14:
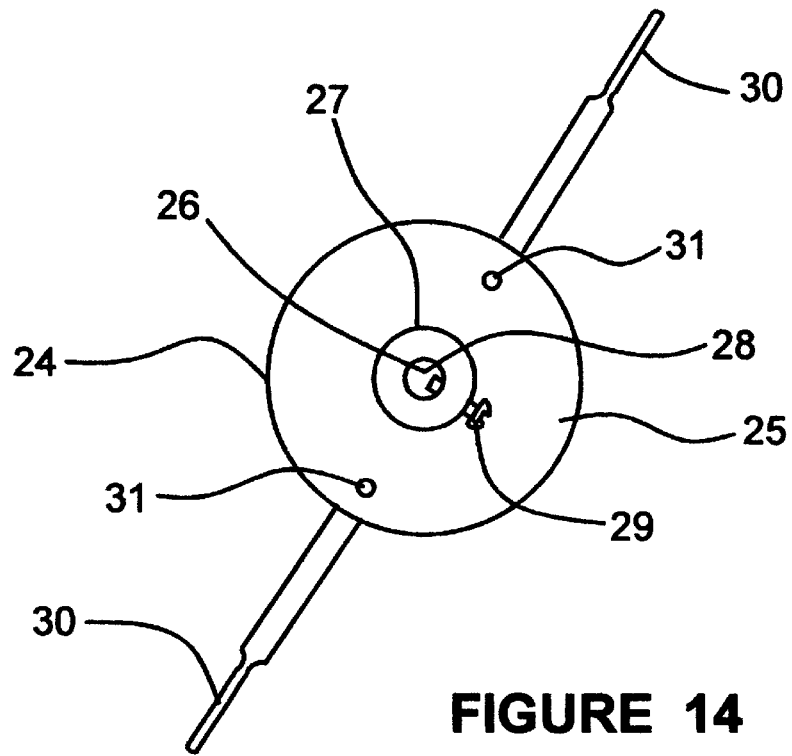
FIG. 14 is a rear view of the paddle wheel appendage assembly of the invention, viewed perpendicular to the plane of the hub.

As noted above, a variety of appendage assemblies 3 may be used in preparing the decoy of the invention for use, and various appendage assemblies are illustrated and provided for use within the scope of the invention. A paddle wheel appendage assembly, specifically illustrated in FIGS. 14 and 15, preferably includes a plurality of paddles 30 connected to and extending outwardly from the hub, although it should be understood that a single paddle 30 could be used if desired. In the preferred embodiment the number of paddles 30 is two, although more than two could be used, and the paddles are disposed on hub 24 is opposing relationship as shown. Each of paddles 30 is connected to disk 25 of the hub by any convenient conventional means, such fasteners 31, which may comprise rivets, screws, brads or the like. If desired, paddles 30 and disk 25, or the full hub 24, could be integrally formed by a technique such as molding. Each paddle is of sufficient length that a portion of the paddle will extend below the surface of the water when the appendage assemblies are connected to respective drive shafts and with the decoy floating on the water. When the drive means is activated the hubs are caused to rotate, driving the paddles through the water and propelling the decoy along the surface of the water. In addition to propelling the decoy in the water, the movement of the paddles through the water causes water to be splashed toward the rear of the decoy as long as the drive means is activated, providing a further attractive aspect to the decoy.

Figure 16:
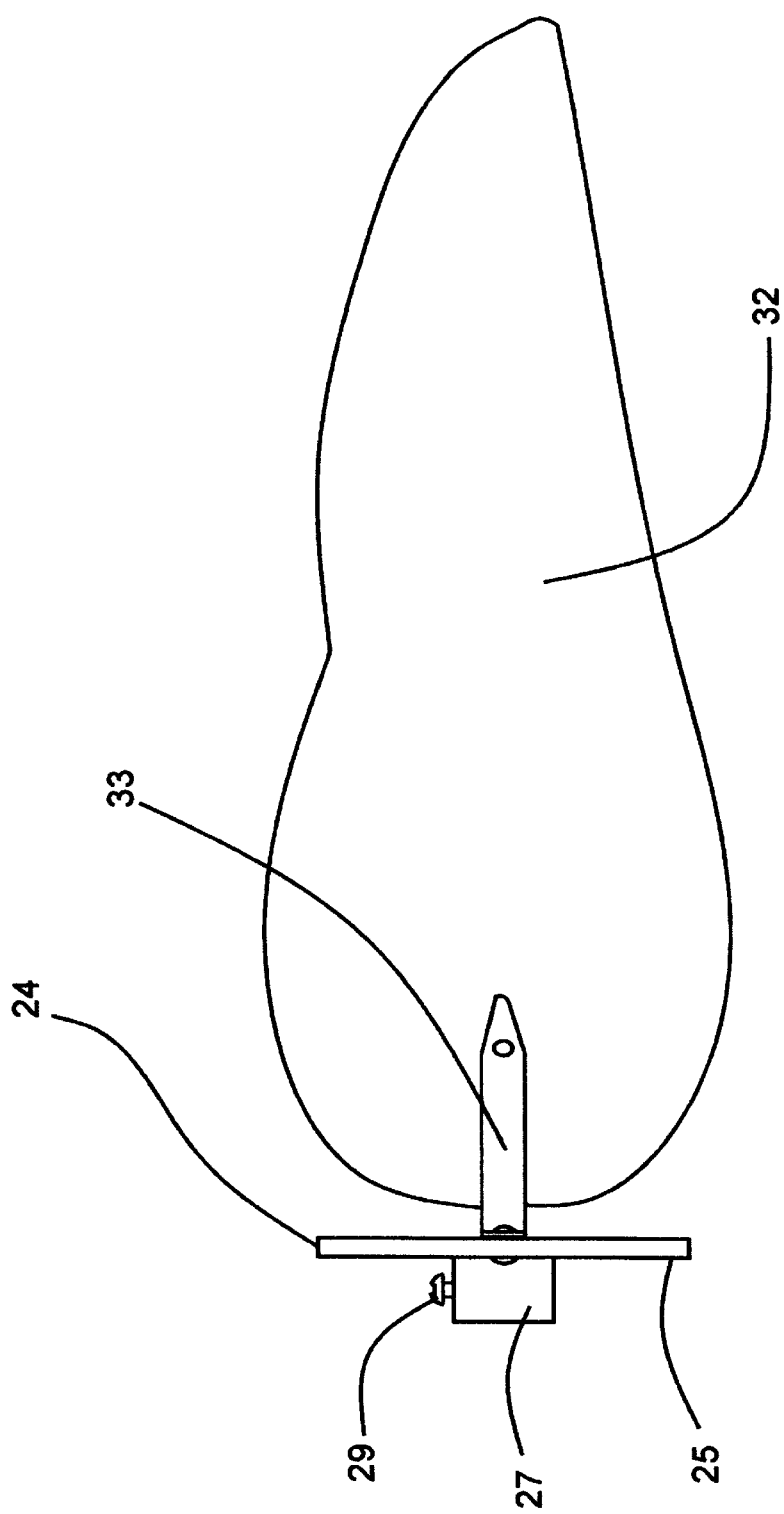
FIG. 16 is a side view of the rotating wing appendage assembly of the invention, viewed parallel to the plane of the hub.

In another variation of the appendage assembly of the invention, paddles 30 are omitted and a single wing 32 is connected to each hub, as shown in FIG. 16. In the preferred embodiment each wing 32 comprises an elongate generally planar body formed with the general configuration and appearance of a waterfowl wing. It is preferred that wings 32 be formed of a resilient material such as a closed cell foam, to reduce weight and to allow some flexing of the wings as they move. The use of a resilient material also reduces the risk of damage when the decoy is transported and handled. Wing 32 is connected to disk 25 of hub 24 with connectors 33, or by other convenient conventional means, with wing 32 extending outwardly from disk 25 with the plane of the wing generally perpendicular to the plane of the disk and with the longitudinal axis of the wing generally aligned with the axis of apertures 26 and 28. When a pair of the rotating wing version of the appendage assembly is connected to the drive shafts extending from the body of the decoy and the drive means is activated, the wings are caused to rotate around their longitudinal axes and mimic the appearance of a live bird flapping its wings. The flapping appearance may be enhanced by coloring one side of each wing a light color and the opposite side a dark color. The width of wing 32 is preferably less than twice the distance from the drive shafts extending from the body of the decoy to the surface of the water on which the decoy is placed to float, so that as wings 32 are caused to rotate by activation of the drive means the edges of the wings remain above the surface of the water. However, if desired, the width of wings 32 may be selected so that a portion of the wing will move through the water as the wing rotates and splash water from the surface as each edge of the wing leaves the water.

Figure 17:
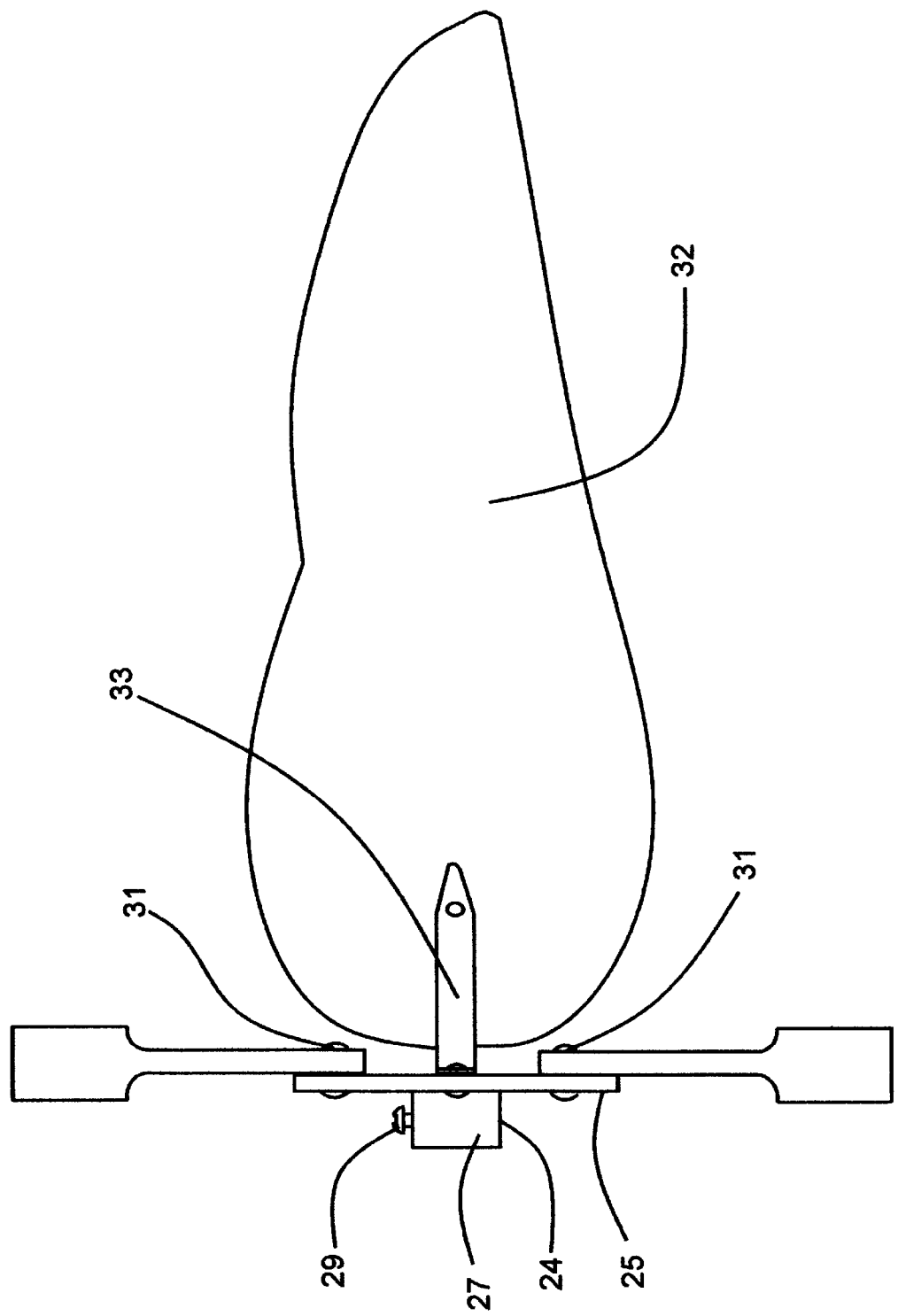
FIG. 17 is a side view of the combined paddle wheel and rotating wing appendage assembly of the invention, viewed parallel to the plane of the hub.

In a further variation of the appendage assembly, shown in FIG. 17, both paddles 30 and a wing 32 are attached to each hub. The paddles extend outwardly from the hub generally in or parallel to the plane of the disk, and the wing extends outwardly from the hub generally perpendicular to the plane of the disk. Upon activation of the drive means the paddles and wings are caused to rotate together in a combination of the movements described above, propelling the decoy along the surface of the water, splashing water around the decoy, and mimicking the appearance of flapping wings.

Figure 18:
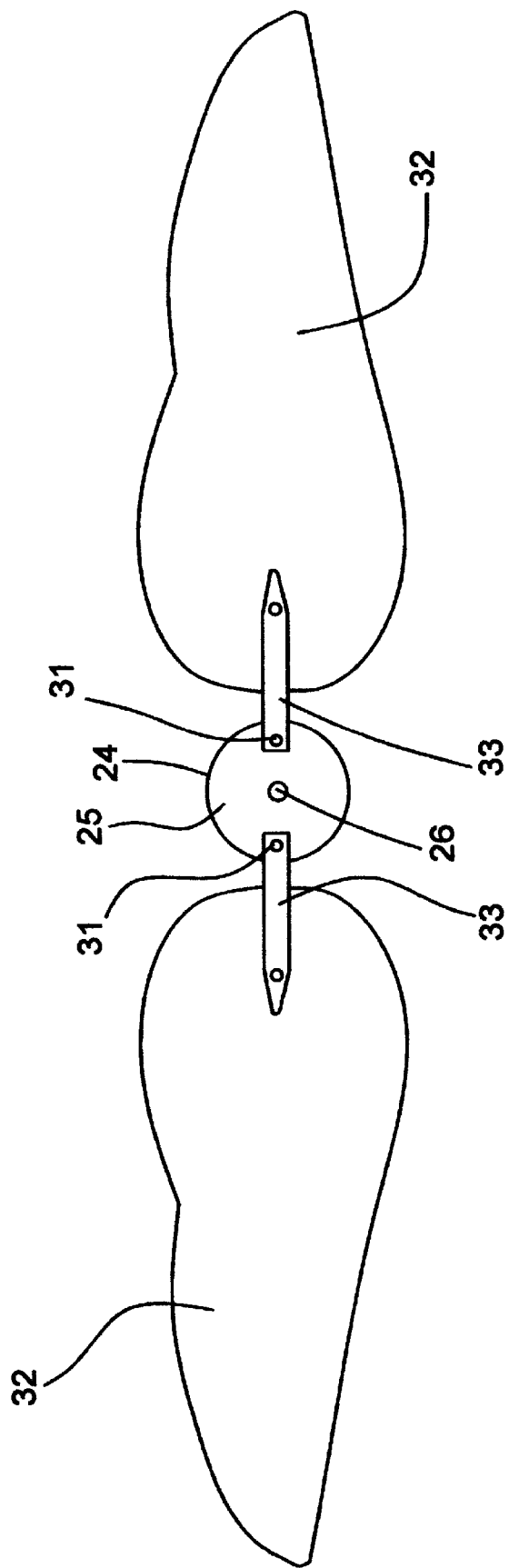
FIG. 18 is a front view of the windmill wing appendage assembly of the invention, viewed perpendicular to the plane of the hub.
Figure 19:
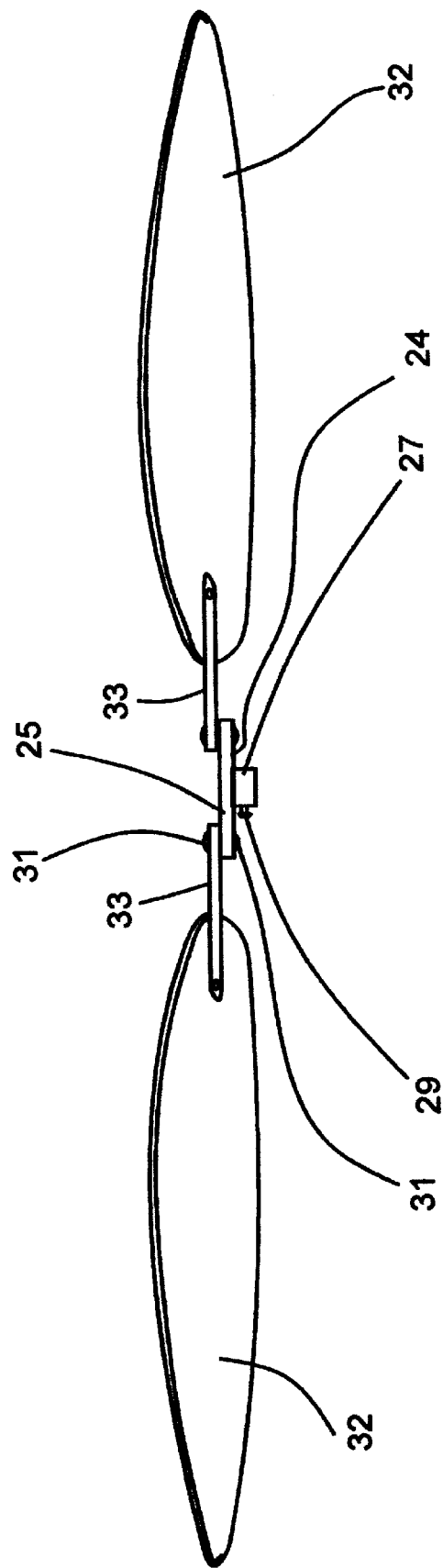
FIG. 19 is a side view of the windmill wing appendage assembly of the invention, viewed parallel to the plane of the hub.

In a still further variation, wings 32 are connected to hub 24 so as to extend outwardly therefrom in a direction generally parallel to the disk of the hub. In the preferred embodiment, illustrated in FIGS. 18 and 19, the number of wings used in this variation is two, and the wings are connected to the disk of the hub in opposed relation, using connectors 33. When the drive means is activated the wings attached to the hubs are caused to rotate in a windmill fashion around the aligned axes of the drive shafts and hub apertures to simulate wing flapping in a manner that is visually different from the simulated wing flapping produced by the appendage assemblies in which the wings extend perpendicular to the plane of the disk to which they are connected. When this variation of the appendage assemblies are used the decoy should be placed on a stand or otherwise suspended above the surface of the water or the ground, since the path swept by the wings extends sufficiently below the decoy to preclude effective rotation if the decoy were operated while floating on the surface of the water. Since the drive means is fully contained within the body of the decoy and there are no wires extending from the decoy to an external battery or other power source, the decoy may just as readily be placed on a stand over the water as over dry land.

The decoy of the invention may be provided to users with any one of the disclosed appendage assemblies, or with any combination of those assemblies. Since the appendage assemblies may be easily and quickly interchanged, a single decoy body and drive means may be used to produce any of the types of decoy motion described by selecting and attaching the desired appendage assemblies to the drive shafts. Each of the appendage assemblies produces a type of decoy motion that is effective in attracting live waterfowl, and the unique interchangabiliy of the appendage assemblies allows a user to choose among a range of motion options and select the motion or motions the user feels will be most effective in a given situation.

In addition to the various embodiments of the appendage assemblies within the scope of the decoy of the invention, alternative embodiments of the drive assembly may also be utilized, The use of dual drive motors in the preferred embodiment is considered to be advantageous, especially when an appendage assembly with paddles is used. Unless the rotation of the paddles is synchronized and the positions of the paddles on each side of the decoy are aligned, paddles on opposite sides of the decoy will be drawn through the water at different times and the uneven application of propulsive force will cause the body of the decoy to "waggle" from side to side, further mimicking movements exhibited by live birds. Because the speed of rotation of the two motors 14 will typically vary slightly, the degree of synchronization of the two paddle wheel assemblies will change during operation of the decoy, and the direction of movement by the decoy will vary over time, enhancing its mimicry of natural waterfowl behavior.

Figure 10:
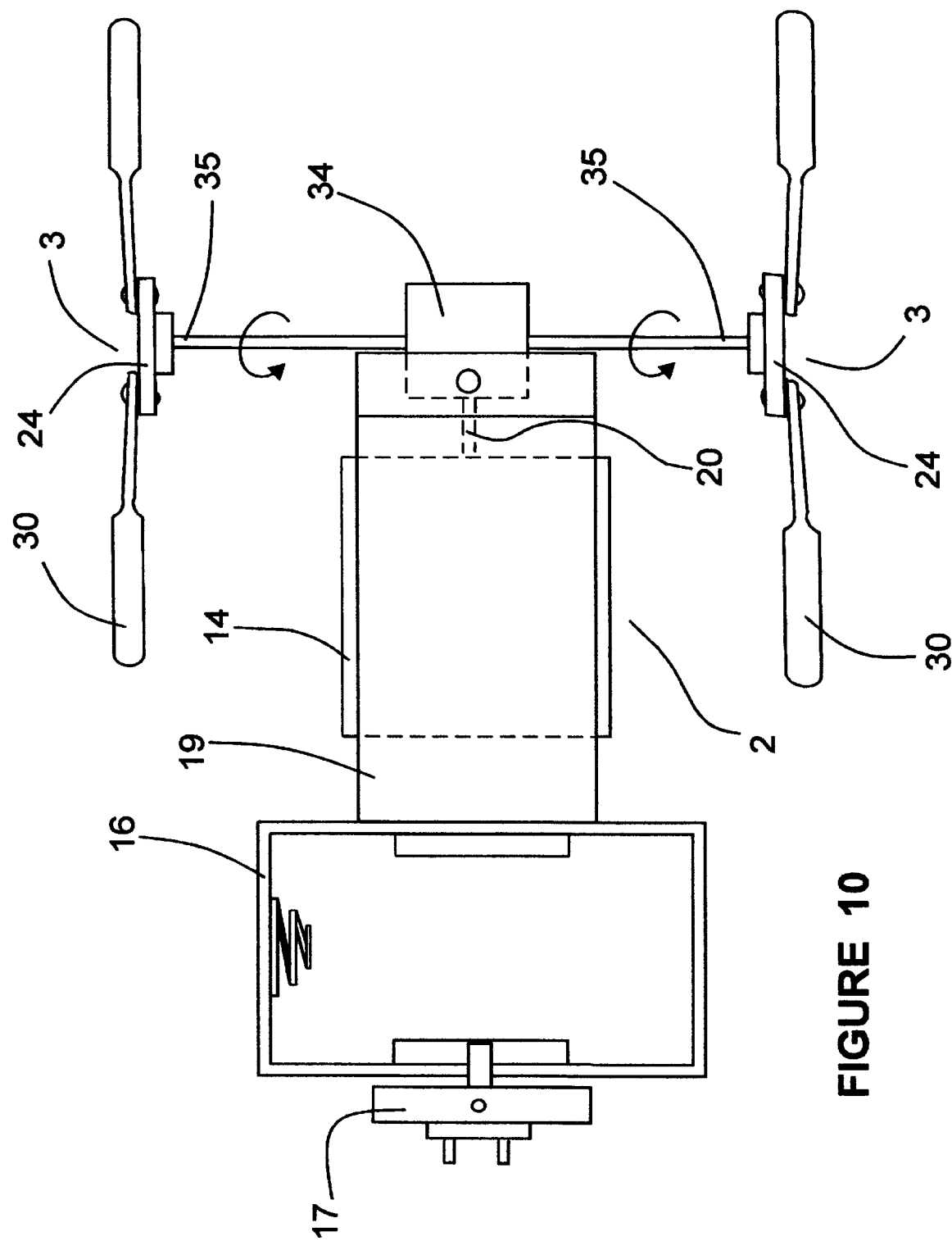
FIG. 10 is a top view of an alternative embodiment of the drive assembly of the invention.
Figure 11:
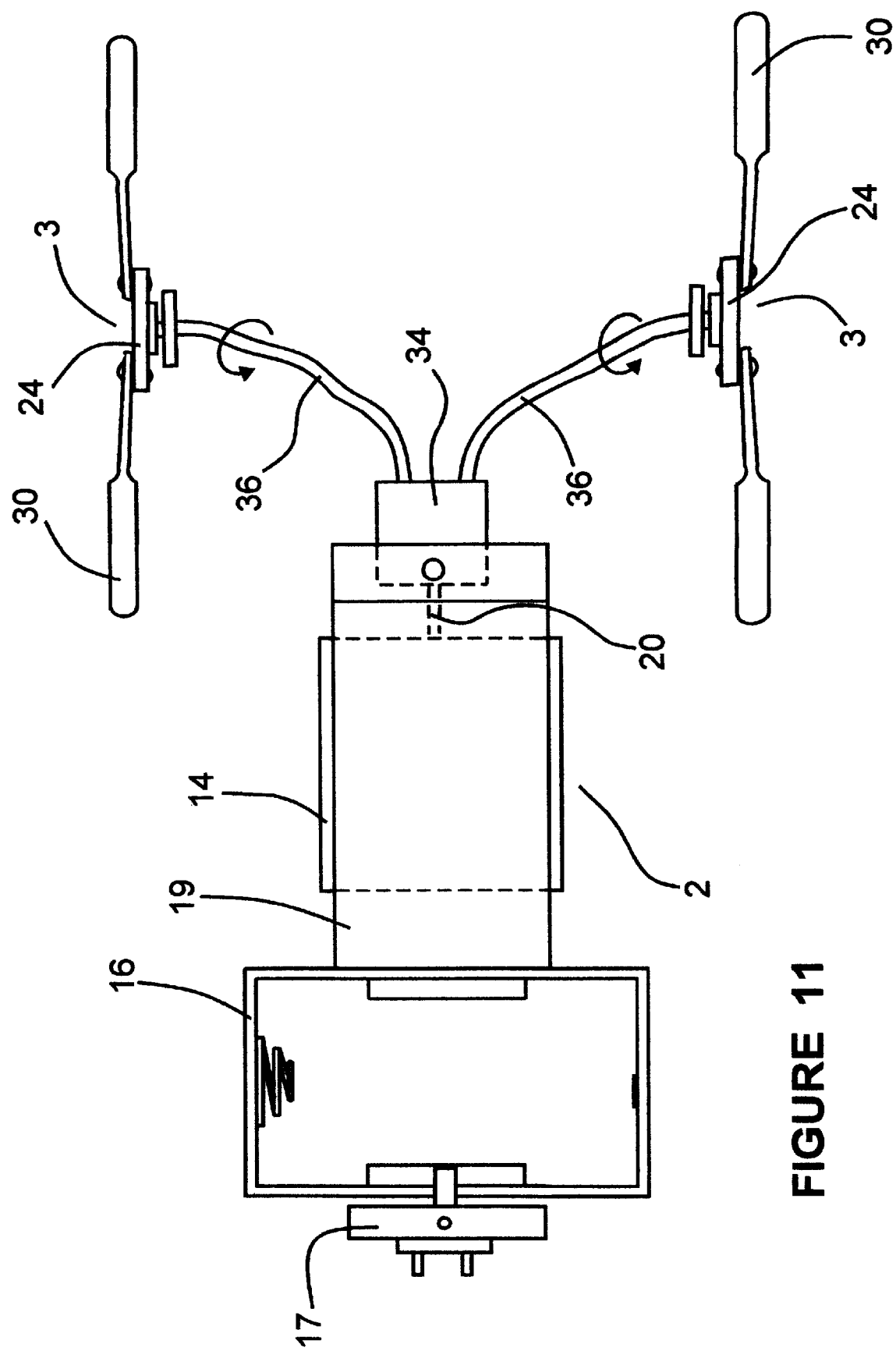
FIG. 11 is a top view of another alternative embodiment of the drive assembly of the invention.
Figure 12:
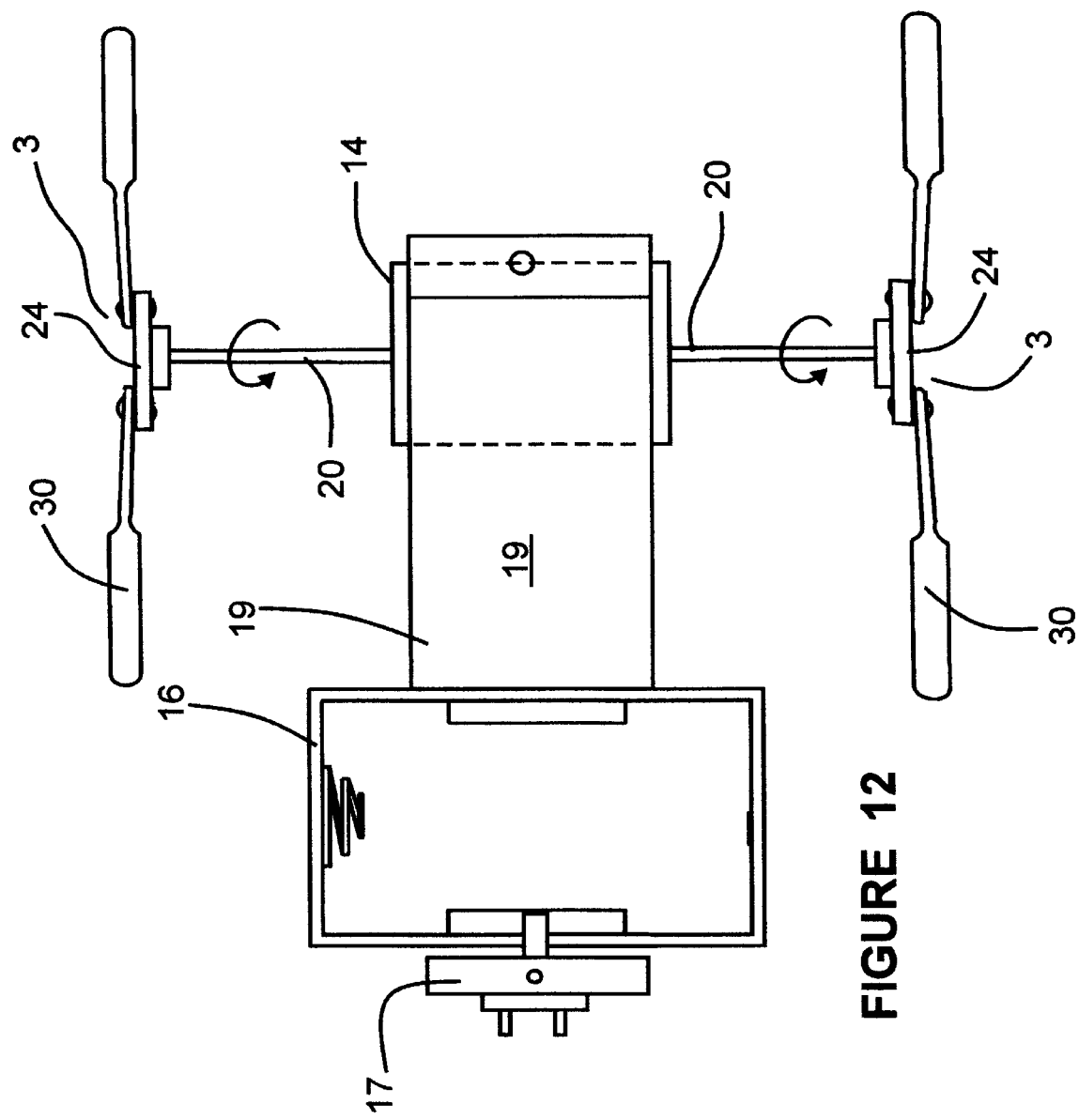
FIG. 12 is a top view of a further alternative embodiment of the drive assembly of the invention.
Figure 13:
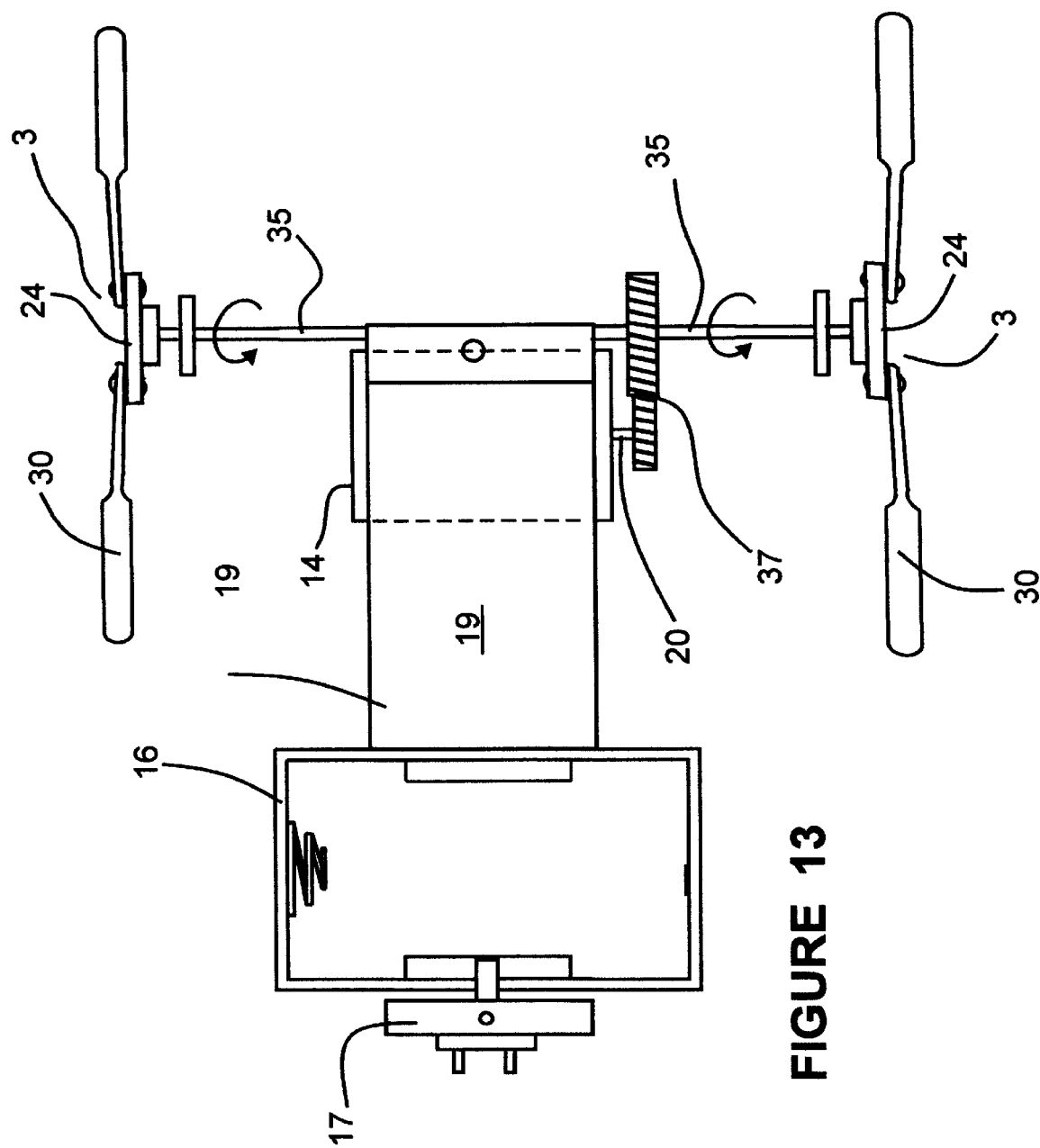
FIG. 13 is a top view of an additional embodiment of the drive assembly of the invention.

Nevertheless, various alternative embodiments with a single drive motor may be used within the scope of the invention. In a first alternative embodiment, illustrated in FIG. 10, a single motor 14 is used to drive both appendage assemblies. In this alternative approach the motor is attached to mounting bracket 19 with output shaft 20 extending parallel to the longitudinal axis of body 1. Output shaft 20 is coupled to a transmission unit 34 from which rigid drive shafts 35 extend through shaft apertures 12. In another alternative embodiment, illustrated in FIG. 11, a single motor 14 is also coupled to a transmission unit 34, but the rigid drive shafts 35 are replaced by flex shafts 36. In a further alternative embodiment, illustrated in FIG. 12, a single motor 14 with dual output shafts 20 is used. In the embodiment of FIG. 12, motor 14 is disposed transverse to the longitudinal axis of the body of the decoy and is connected to mounting bracket 19 with its output shafts extending outwardly and through the opposed shaft apertures 12 in the sides of the decoy body. An alternative embodiment with a similar transverse orientation of motor 14 is illustrated in FIG. 13, in which gears 37 are used to transfer rotation of output shaft 20 to drive shaft 35.

Figure 9:
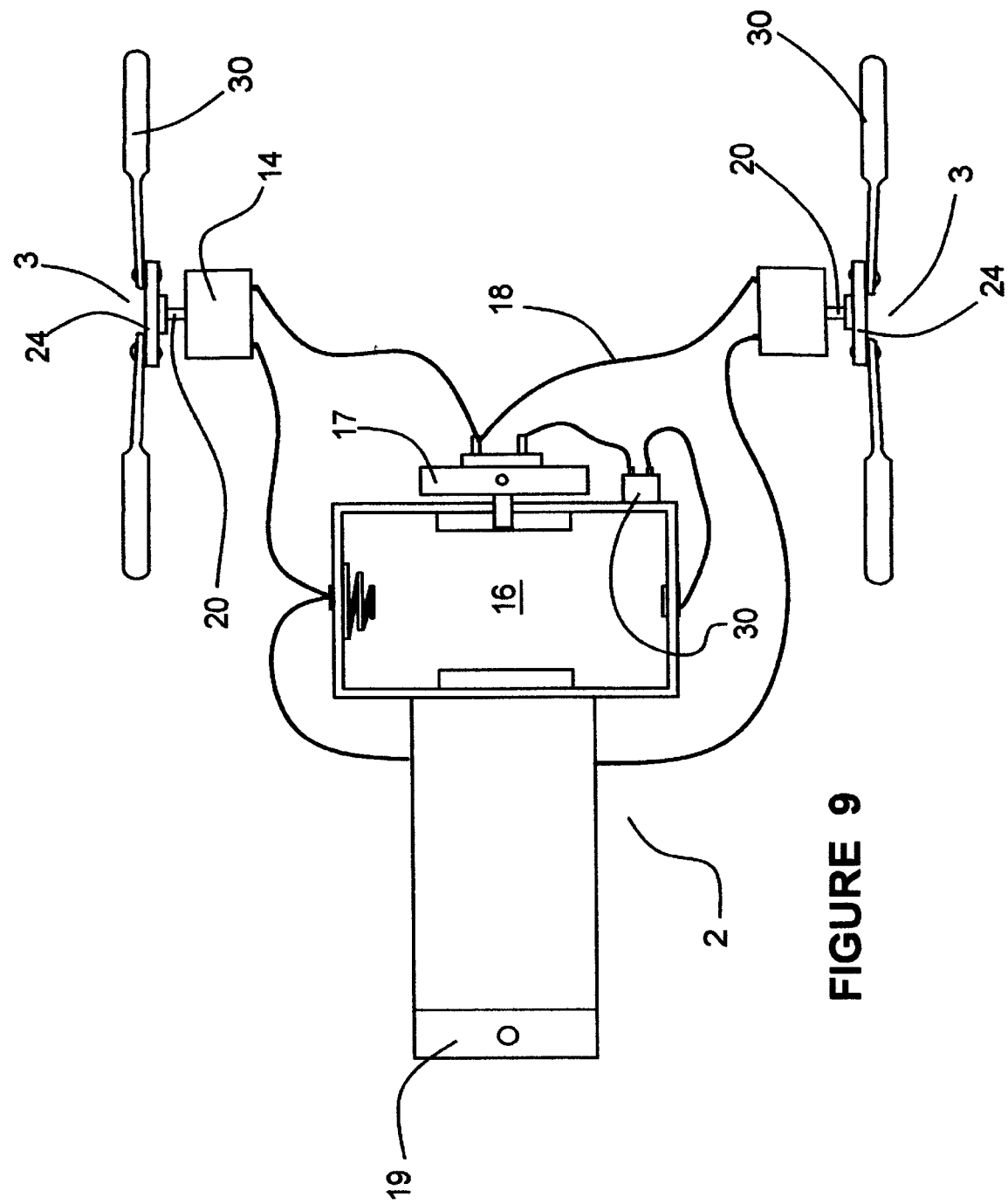
FIG. 9 is a top view of the drive assembly of the preferred embodiment of the invention, with paddle wheel appendage assemblies connected thereto.

As an alternative to the use of an "on-off" type switch for switch 17 of the preferred embodiment, a variable resistance switch may be utilized to allow the speed of motor(s) 14 to be adjusted by a user of the decoy. It will be understood that the variable resistance switch alternative embodiment may be used to control motors 14 of the preferred embodiment or to control the single motor 14 of any of the disclosed alternative embodiments. In a further alternative embodiment for controlling the operation of motor(s) 14, an interrupter relay 38 may be included in the electrical circuit, as generally illustrated in FIG. 9. Relay 38, if used, will intermittently interrupt the flow of electrical power from the battery to the motor(s), resulting in intermittent movement of the appendage assemblies instead of the continuous movement exhibited by the preferred embodiment. Like the alternative variable resistance switch, this alternative may be used with any of the alternative motor and drive embodiments as well as with the preferred dual motor embodiment.

Figure 20:
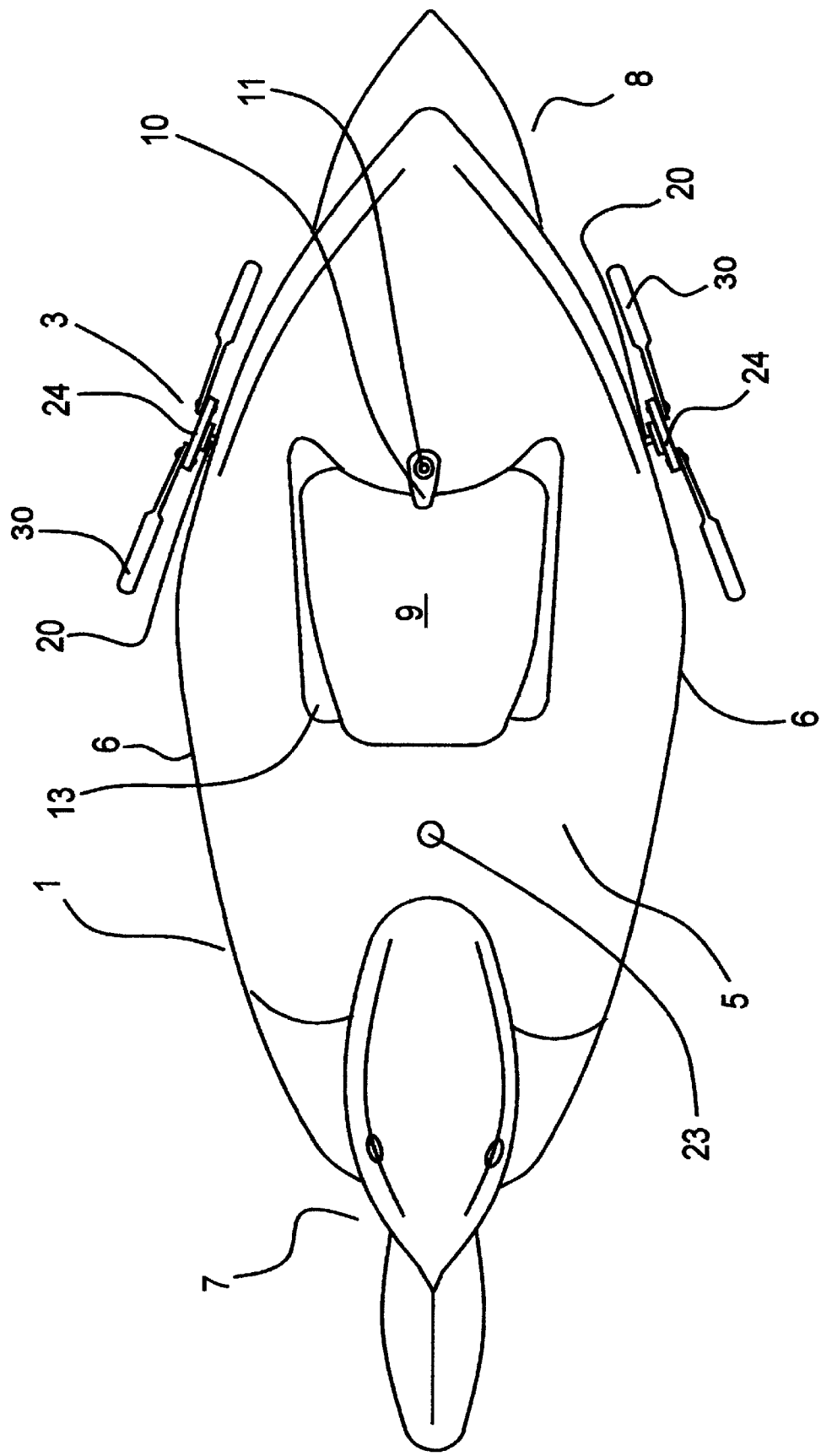
FIG. 20 is a top view of an alternative embodiment of the decoy of the invention, shown with paddle wheel appendage assemblies disposed in an alternative configuration.

It is preferred that shaft apertures 12 be positioned in the decoy body so that the output shafts of motors 14, or drive shaft or shafts 35, if used, extend outward from the sides 6 of the body at the widest point of the body in a generally perpendicular relationship to the longitudinal axis of the body. In this preferred configuration the plane of rotation of the disks of the hubs is generally parallel to the longitudinal axis of the decoy, and the possibility of interference between rotating appendages and the decoy body is minimized. However, shaft apertures 12 could be offset toward the tail of the decoy as shown in FIG. 20, if desired, when the dual motors of the preferred embodiment or the flex shaft alternative are utilized.

The foregoing description of the preferred embodiments and certain alternative embodiments of the invention is intended to be illustrative and not limiting. The invention is susceptible to further alternative embodiments and variations in design and in use, all within the scope of the invention as disclosed and claimed.

What is claimed is:

1. A waterfowl decoy with rotating appendages, comprising a body with a longitudinal axis, a head end, a tail end, a top, two opposing sides, and a hollow interior with a pair of shaft apertures formed on said sides in opposed relation across the longitudinal axis;

a drive assembly including a pair of rotatable drive shafts each extending from the interior of the body through one of the respective shaft apertures;

a pair of appendage assemblies, each having a hub, hub aperture and at least one appendage, connected to said drive shafts extending from the decoy body, and each appendage having a first end connected in proximate relation to the hub and extending outwardly from the first end; and said one of the pair of appendage assemblies includes an elongated wing appendage extending generally parallel to the longitudinal axis of one of said drive shafts, said elongated wing rotating without contact to a water level.

2. The waterfowl decoy with rotating appendages of claim 1 wherein the drive assembly comprises a pair of electric motors.

3. The waterfowl decoy with rotating appendages of claim 1 wherein the drive assembly has an interrupter that interrupts the rotation of at least one of said drive shafts.

4. The waterfowl decoy with rotating appendages of claim 1 wherein the speed of rotation of at least one of said drive shafts is adjustable.

5. The waterfowl decoy with rotating appendages of claim 1 further comprising:

a second pair of appendage assemblies that has at least one elongated paddle extending generally perpendicular to the longitudinal axis of one of said drive shafts.

6. A waterfowl decoy with rotating appendages, comprising a body with a longitudinal axis, a head end, a tail end, a top, two opposing sides, and a hollow interior with a pair of shaft apertures formed on said sides in opposed relation across the longitudinal axis;

a drive assembly including a pair of rotatable drive shafts each extending from the interior of the body through one of the respective shaft apertures;

a pair of appendage assemblies, each having a hub, hub aperture and at least one appendage, connected to said drive shafts extending from the decoy body, and each appendage having a first end connected in proximate relation to the hub and extending outwardly from the first end; and said one of said pair of appendage assemblies includes an elongated paddle extending generally perpendicular to the longitudinal axis of one of the drive shafts.

7. The waterfowl decoy with rotating appendages of claim 6 wherein the drive assembly comprises a pair of electric motors.

8. The waterfowl decoy with rotating appendages of claim 6 wherein the rotation of the drive shafts is interruptable.

9. The waterfowl decoy with rotating appendages of claim 6 wherein the speed of rotation of the drive shafts is adjustable.

10. The waterfowl decoy with rotating appendages of claim 6 further comprising:
   a second pair of appendage assemblies that has at least one elongated wing extending generally parallel to the longitudinal axis of one of said drive shafts.

11. A waterfowl decoy with rotating appendages, comprising:
   a body with a longitudinal axis, a head end, a tail end, a top, two opposing sides, and a hollow interior with a pair of shaft apertures formed on said sides in opposed relation across the longitudinal axis;
   a drive assembly including a motor assembly within said hollow interior rotating a pair of rotatable drive shafts, and each said shaft extending outward from the interior of the body through a respective shaft aperture;
   a pair of appendage assemblies, each having a hub, a hub aperture which is releasably attached to one of said drive shafts, and each of said assemblies has an appendage having a first end and a second end, said first end connected in proximate relation to the hub and said second end extending outwardly from said hub, and each appendage assembly capable of rotating when the drive shaft rotates; and
   said one of the pair of appendage assemblies includes an elongated wing extending generally in parallel to the longitudinal axis of one of the drive shafts, said elongated wing rotating without contact to a water level.

12. The waterfowl decoy with rotating appendages of claim 11 wherein the drive assembly includes two electric motors.

13. The waterfowl decoy with rotating appendages of claim 11 wherein the rotation of the drive shafts is interruptable.

14. The waterfowl decoy with rotating appendages of claim 11 wherein the speed of rotation of the drive shafts is adjustable.

15. The waterfowl decoy wit rotating appendages of claim 11 further comprising:
   a second pair of appendage assemblies that includes at least one elongated paddle extending generally perpendicular to the longitudinal axis of one of said drive shafts.

16. A method for animating a waterfowl decoy comprising the steps of:
   providing a decoy body with a longitudinal axis, a head end, a tail end, a top, two opposing sides, and a hollow interior with a pair of shaft apertures formed on said sides in opposed relation across the longitudinal axis;
   providing a drive assembly within said hollow interior with a pair of drive shafts extending from the interior of the body through each respective said shaft aperture;
   attaching a pair of appendage assemblies, each having a hub, a hub aperture in said hub to releasably attach the appendage assemblies to each of said drive shafts, wherein each appendage assembly includes a first end and a second end and each of said appendage assemblies is connected at the first end to the hub and extending outward from said hub; and
   rotating said drive shafts with said appendage assemblies attached, wherein at least one appendage assembly includes an elongated wing that extends in parallel to the longitudinal axis of one of said drive shafts, said elongated wing rotating without contact to a water level.

17. The method for animating a waterfowl decoy of claim 16 further comprising:
   a second pair of appendage assemblies that includes an elongated paddle.

18. The method for animating a waterfowl decoy of claim 16 wherein the speed of rotation of the drive shafts is adjustable.

19. The method for animating a waterfowl decoy of claim 16 wherein the rotation of the drive shafts is interruptable.

\* \* \* \* \*